July 6, 1926.

R. G. ROBERTSON

SAFETY CRANK FOR ENGINES

Filed March 23, 1925

1,591,103

Inventor
Robert G. Robertson
By *Lancaster and Allwine*
Attorneys

Patented July 6, 1926.

1,591,103

UNITED STATES PATENT OFFICE.

ROBERT G. ROBERTSON, OF CUMBERLAND CITY, TENNESSEE.

SAFETY CRANK FOR ENGINES.

Application filed March 23, 1925. Serial No. 17,747.

This invention relates to improvements in safety cranking apparatus for use in connection with internal combustion engines.

The primary object of this invention is the provision of a safety cranking mechanism for internal combustion engines, embodying a novel release clutching mechanism which will permit the conventional use of the hand crank, but which will release the hand crank from the crank shaft of the internal combustion engine upon back-fire in the latter.

A further object of this invention is the provision of a novel type of hand crank mechanism for use in connection with internal combustion engines, embodying a novel type of friction clutching mechanism adapted to release upon back-fire when cranking.

Other objects and advantages of this invention will be apparent during the course of the following detailed description.

In the accompanying drawing, forming a part of this specification, and wherein similar reference characters designate corresponding parts throughout the several views, Figure 1 is a side elevation of the improved safety cranking device, showing the application of the same upon an internal combustion engine, for cooperative use in connection with cranking thereof.

Figure 1:
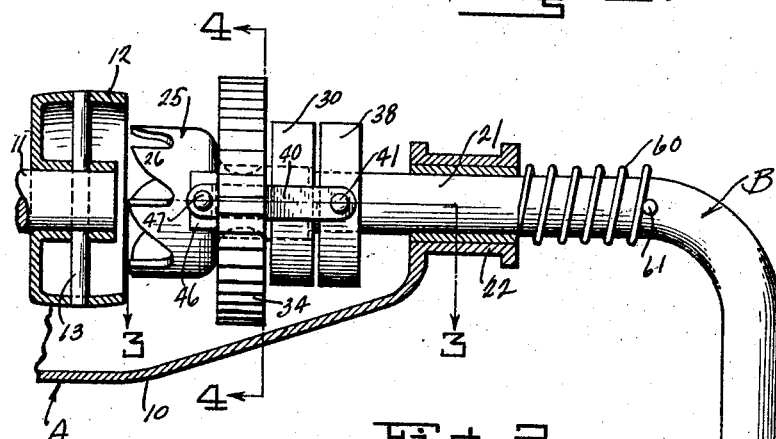
Figure 2:
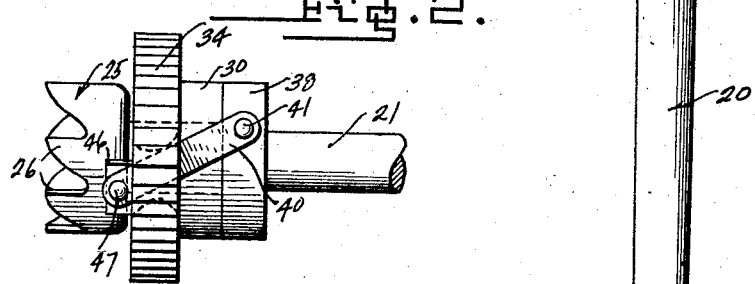
Figure 2 shows the improved details of this invention in a friction clutching position similar to that when a cranking operation is being effected.
Figure 3:
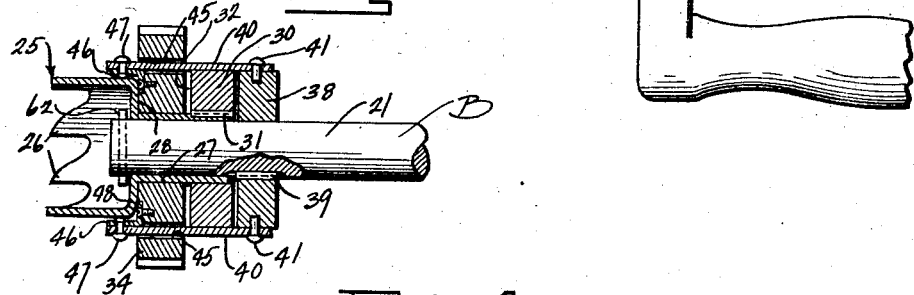
Figure 3 is a cross sectional view taken through the details of this invention substantially on the line 3—3 of Figure 1.

In the drawing, wherein for the purpose of illustration is shown only a preferred embodiment of this invention, the letter A may generally designate an internal combustion engine, upon which the improved safety crank device B is used.

The internal combustion engine A may be of any approved character, comprising the engine casing 10 and crank shaft 11. On the end of the crank shaft 11 the conventional hand crank engaging cap or member 12 is provided which has a pin 13 therein which the catch member of the safety crank B is adapted to engage to effect a cranking operation.

The safety crank B preferably comprises the crank body 20, having a shaft portion 21 journalled in a bearing 22 of the internal combustion engine casing 10, so that said shaft portion 21 is reciprocable in the bearing, and is in axial alignment with the internal combustion engine shaft 11.

The shaft portion 21 at its end adjacent the crank shaft 11 of the internal combustion engine is preferably provided with a jaw or catch member 25, rotatably mounted upon the shaft 21, and reciprocable longitudinally of said shaft. This catch member 25 comprises a hollow cylindrical shell provided with teeth 26 adapted to receive the pin 13 therebetween for the purpose of connecting the crank shaft with the hand crank. This catch member 25 includes a sleeve portion 27 rotatably journalled on the hand crank shaft portion 21, and the sleeve portion 27 is of course reduced with respect to the catch member 25. At the end of the sleeve 27, in spaced relation from the wall 28 of the catch member is a disc 30, keyed as at 31 to said sleeve, and providing a space 32 between the said disc and the wall 28 for rotatably supporting a ratchet wheel clutch member 34, which is not only rotatable on said sleeve portion 27, but is reciprocable between the disc 30 and the wall 28.

Fixed upon the crank shaft portion 21, is a collar 38, keyed as at 39, which may be of substantially the same diameter as the disc 30. This collar 38 is disposed on the shaft portion 21 at the opposite side of the disc 30 from the ratchet wheel 34, and it is connected with the ratchet wheel 34 by means of pivoted connecting bars or links 40; said bars 40 being provided two in number, and pivoted as at 41 at diametrically opposed points on the periphery of the collar 38, and extending across the periphery of the disc 30, and thru suitable arcuate openings 45 in the ratchet wheel 34. The ratchet wheel 34 is of course of greater diameter than either the disc 30 or the collar 38. At their ends at the opposite side of the ratchet wheel 34 from the disc 30, the connecting links 40 are pivotally connected with cleats 46, as by means of pivot pins 47; said cleats 46 being rigidly connected with the ratchet wheel 34, as by means 48, at the opposite side of said ratchet wheel 34 from the disc 30.

The ratchet wheel 34 is provided with teeth 50 in the periphery thereof, against which a pawl 51 is adapted to be operated; said pawl 51 being a spring urged pawl carried by engine casing 10, to prevent rotation of the pawl of the ratchet wheel in one direction.

Referring to the operation of the invention the safety hand crank device B is carried on the casing of the internal combustion engine normally in the position illustrated in Figure 1 of the drawing. A compression spring 60 at one end engages the bearing 22 and at the other end engages a pin 61 carried by the hand crank 20, to urge the catch member 25 out of engagement with the internal combustion engine crank shaft. To crank the engine it is merely necessary to press inwardly on the hand crank safety device B, which will press the teeth 26 of the catch member 25 into engagement with the pin extension 13 of the crank shaft 11, as can readily be understood. Upon turning of the crank 20 in a clock-wise direction, the collar 38 will of course be turned therewith, and such movement will cause the connecting links 40 to pull the ratchet wheel 34 against the disc 30, and it will likewise cause the disc 30 to be clamped in a friction clutching engagement between the collar 38 and the ratchet wheel 34, to effectively couple the clutch member 25 in a connected engagement with the hand crank shaft 21, so that the engine crank shaft may be rotated. The clutching arrangement formed by the collar 38 and the ratchet wheel clutch part 34 upon the disc 30 is very firm, and the greater the effort required to rotate the crank shaft, the more firm will be the clutching engagement of these parts upon the disc 30, so that the catch member 25 will be keyed against sliding movement upon the hand crank shaft 21.

Figure 4:
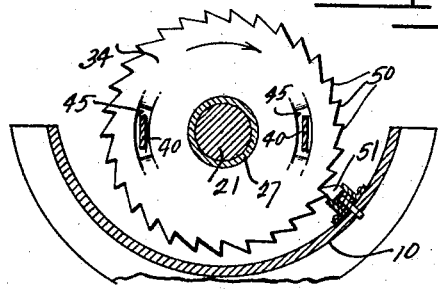
Figure 4 is a cross sectional view taken through the improved device substantially on the line 4—4 of Figure 1.

Assuming that a back-fire takes place in the internal combustion engine, this will cause a reverse rotation of the crank shaft 11. As the catch member 25 is connected with the internal combustion engine crank shaft, during such reverse rotation the catch member will move with the crank shaft, and at the start of the rotation of the crank shaft the ratchet wheel 34 will tend to rotate therewith. However, due to the provision of the pawl 51, the ratchet wheel will be prevented from reverse turning, as is illustrated in Figure 4 of the drawings, and will be held stationary. As the connecting links 40 are passed thru the slots or openings 45 in the ratchet wheel, said ratchet wheel thus serves as a fulcrum for the connecting bars 40. Upon further reverse rotation of the crank shaft, the connecting links 40 will then tend to be straightened, to the position illustrated in Figure 1, which will push the hand crank shaft 21 outwardly, releasing the collar 38 from its frictional clutching engagement with the disc 30, and also releasing the ratchet wheel 34 from its clutching engagement with the disc 30. This then positions the catch member 25 in a loosely coupled relation upon the hand crank shaft portion 21, so that the back-fire does not further move the safety hand crank device B, and will thereby prevent injury to the operator. If desired, a pin 62 may be provided on the hand crank shaft 21 to prevent detachment of the catch member 25, but this pin is not considered essential, for the reason that the catch member 25 is held in position on the shaft portion 21 by reason of the disc 30.

From the foregoing description of this invention it is apparent that a novel type of safety hand crank has been provided for use in connection with internal combustion engines, which embodies a novel departure in the provision of a safety frictional clutch device which releases the connection between the hand crank and internal combustion engine crank shaft upon back-fire in the engine.

Various changes in the shape, size, and arrangement of parts may be made to the form of the invention herein shown and described, without departing from the spirit of the invention or the scope of the claims.

I claim:

1. In a safety hand cranking device for internal combustion engines a shaft, a catch member rotatable on said shaft including a disc portion, a clutch part keyed to said shaft at one side of said disc portion, a second clutch part rotatable with respect to the shaft at the opposite side of said disc portion, and means connecting said clutch parts for gripping the disc therebetween upon rotation of the hand crank shaft whereby to key the catch member to the hand crank shaft.

2. In combination with an internal combustion engine including a casing and a crank shaft, a hand crank shaft, a catch member rotatably carried by the hand crank and adapted for connection to said engine crank shaft, a disc keyed with said catch member, a clutch part keyed with said hand crank shaft at one side of said disc, a ratchet wheel rotatable with said hand crank shaft at the opposite side of said disc, means connecting the first clutch part with said ratchet wheel whereby the same will frictionally clutch upon the disc to connect the catch member with the hand crank shaft upon rotation of the same, and a pawl carried by said engine casing for cooperation against said ratchet wheel to prevent rotation of the same in one direction.

3. In a device of the class described the combination with an internal combustion engine including a crank shaft, a hand crank including a shaft portion, a catch member rotatable on the hand crank shaft portion for connection with said internal combustion engine crank shaft, a disc connected with said catch member, clutch parts disposed at opposite sides of said disc one of which is keyed to the hand crank shaft and the other rotatable with respect to said shaft, link means connecting the said clutch parts together whereby they may be moved into and out of frictional clutching engagement with the disc therebetween, and means for preventing rotation of the clutch part which is rotatable on the shaft of the hand crank in a direction counter to the cranking rotation of the hand crank.

4. In a safety hand crank for internal combustion engines a hand crank including a shaft, a catch member including a sleeve rotatably bearing on said shaft, a disc keyed on said sleeve in spaced relation with the catch portion, a collar keyed on said shaft at one side of said disc opposite to the catch portion, a clutch part rotatable on said sleeve between the disc and catch member, links pivotally connecting the collar with the clutch part whereby the collar and clutch part may be held into and out of frictional clutching engagement with the opposite sides of said disc.

5. In a safety hand crank for internal combustion engines a hand crank including a shaft, a catch member including a sleeve rotatably bearing on said shaft, a disc keyed on said sleeve in spaced relation with the catch portion, a collar keyed on said shaft at one side of said disc opposite to the catch portion, a clutch part rotatable on said sleeve between the disc and catch member, links pivotally connecting the collar with the clutch part whereby the collar and clutch part may be held into and out of frictional clutching engagement with the opposite side of said disc, and means for holding said clutch part between the catch member and disc against rotation in one direction.

6. In a safety hand crank for internal combustion engines a hand crank member including a shaft portion, a catch member including a rigid sleeve rotatable on said shaft, a disc keyed on said sleeve in spaced relation with the catch member, a collar keyed on the shaft at one side of said disc, an enlarged ratchet wheel rotatable on the sleeve between the disc and catch member providing transverse openings therethrough, link bars pivoted on said collar at the periphery thereof extending across said disc and through the openings of said ratchet wheel, cleats pivotally connecting the links at the opposite side of said ratchet wheel from said disc, said links being sufficiently long to permit movement of the collar and ratchet wheel in spaced non-frictional clutching engagement with the disc, and to permit their frictional clutching engagement at opposite sides of said disc when the shaft is rotated.

7. In a safety crank for engines the combination with an internal combustion engine including a casing portion and a crank shaft, a hand crank including a shaft portion, means rotatably mounting the shaft portion in alignment with the crank shaft, a catch member rotatably mounted on the shaft portion of the hand crank including a catch portion and a sleeve bearing on said shaft portion of the hand crank for rotary and longitudinal sliding movement thereon, said catch member being of a nature for engaging the crank shaft upon movement of the hand crank longitudinally of the crank shaft, a disc keyed upon said sleeve of the catch member in spaced relation with the catch portion of the catch member, a clutch part keyed upon the shaft of said hand crank at one side of said disc, a ratchet wheel friction disc pivotally and slidably mounted on the sleeve at the opposite side of said first mentioned disc from said clutch part, and links pivotally connected to said ratchet wheel disc at one end of each and pivotally connected at their opposite ends to the clutch part which is keyed on the shaft of said hand crank, said links being of such nature that during normal position the disc which is keyed to the sleeve, the clutch part, and the ratchet wheel disc are in spaced relation, and means cooperating with the ratchet wheel to normally prevent rotation thereof in one direction.

ROBERT G. ROBERTSON.